United States Patent
Hsu

(10) Patent No.: US 6,994,236 B2
(45) Date of Patent: Feb. 7, 2006

(54) MONITORING SUPPORTING DEVICE FOR ATTACHING TO VEHICLES

(76) Inventor: Te Hsin Hsu, P.O. Box 4-67, Hsin Chuang, Taipei (TW) 242

( * ) Notice: Subject to any disclaimer, the term of this patent is extended or adjusted under 35 U.S.C. 154(b) by 116 days.

(21) Appl. No.: 10/207,543

(22) Filed: Jul. 27, 2002

(65) Prior Publication Data

US 2004/0016782 A1   Jan. 29, 2004

(51) Int. Cl.
  *B60R 7/00* (2006.01)
(52) U.S. Cl. .............. 224/275; 224/530; 224/553; 297/188.06; 297/217.3
(58) Field of Classification Search ........ 224/275, 224/929, 553, 530, 564, 539, 42.32; 297/188.01, 297/188.04, 188.06, 188.07, 217.3, 232; 361/753, 831
  See application file for complete search history.

(56) References Cited

U.S. PATENT DOCUMENTS

| | | | | |
|---|---|---|---|---|
| 3,205,522 A | * | 9/1965 | Then .................. 248/184.1 |
| 3,273,192 A | * | 9/1966 | Mazzella .............. 15/230.11 |
| 4,383,626 A | * | 5/1983 | Weinblatt ................. 224/275 |
| 4,946,120 A | * | 8/1990 | Hatcher ..................... 91/309 |
| 5,207,471 A | * | 5/1993 | Mutschler et al. ........ 296/37.12 |
| 5,507,556 A | * | 4/1996 | Dixon .................. 297/217.3 |
| 5,529,265 A | * | 6/1996 | Sakurai ............... 297/188.01 |
| 5,713,633 A | * | 2/1998 | Lu ..................... 297/217.3 |
| 5,842,715 A | * | 12/1998 | Jones .................. 297/217.3 |
| 6,092,705 A | | 7/2000 | Meritt ..................... 224/275 |
| 6,216,927 B1 | * | 4/2001 | Meritt ..................... 224/275 |
| 6,283,299 B1 | * | 9/2001 | Lee ...................... 206/760 |
| 6,418,010 B1 | * | 7/2002 | Sawyer ................... 361/681 |
| 6,473,315 B2 | * | 10/2002 | Denmeade ................ 224/275 |

FOREIGN PATENT DOCUMENTS

JP  2-158437  * 6/1990
JP  11-151986  * 6/1999

* cited by examiner

*Primary Examiner*—Stephen K. Cronin
(74) *Attorney, Agent, or Firm*—Charles E. Baxley

(57) ABSTRACT

A monitor supporting device includes a board for attaching to the vehicle seat, a plate pivotally secured to the board with a pivot axle, and a monitor attached to the plate. The plate may be adjusted relative to the board at any selected angular positions such that the monitor may be adjusted to any suitable or selected angular position relative to the vehicle seat or the users, for allowing the users to easily and comfortably viewing the monitor. A bag may be used for receiving a processor device, and has a box for receiving the monitor.

12 Claims, 6 Drawing Sheets

US 6,994,236 B2

MONITORING SUPPORTING DEVICE FOR ATTACHING TO VEHICLES

BACKGROUND OF THE INVENTION

1. Field of the Invention

The present invention relates to a monitor supporting device, and more particularly to a monitor supporting device for attaching a monitor to the vehicle at suitable positions.

2. Description of the Prior Art

U.S. Pat. No. 6,092,705 to Meritt discloses one of the typical monitor supporting devices for attaching monitors to the backs of the front seats. However, the supporting devices may not be used to adjust the monitors relative to the seat back, or relative to the users, such that the monitors may not be adjusted to the better angular position relative to the users.

The present invention has arisen to mitigate and/or obviate the afore-described disadvantages of the conventional monitor supporting devices.

SUMMARY OF THE INVENTION

The primary objective of the present invention is to provide a monitor supporting device for attaching the monitor to the vehicle at any suitable positions, and for allowing the users to view the monitor at the best viewing direction.

In accordance with one aspect of the invention, there is provided a monitor supporting device for attaching to vehicle seats, the monitor supporting device comprising a board for attaching to the vehicle seat, a plate pivotally secured to the board with a pivot axle, for allowing the plate to be rotated and adjusted relative to the board to selected angular positions, means for attaching a monitor to the plate, and means for retaining the plate to the board at the selected angular positions relative to the vehicle seat, such that the monitor may be adjusted to any suitable or selected angular position relative to the vehicle seat or relative to the users, for allowing the users to easily and comfortably viewing the monitor.

The attaching means includes a casing for receiving the monitor, and means for securing the casing to the plate. The securing means includes a first fastener element disposed on the casing, and a second fastener element disposed on the plate, for engaging with the first fastener element, and for securing the casing to the plate.

The casing includes an upper opening formed therein for receiving the monitor. The casing includes a flap provided thereon for selectively enclosing the upper opening thereof, and for retaining the monitor in the casing. The casing further includes a panel having a first fastener element disposed thereon, and a second fastener element disposed on the flap, for engaging with the first fastener element, and for securing the flap to the casing. The casing includes a transparent window formed therein for viewing the monitor.

The retaining means includes two bars each having a first end pivotally secured to the board and the plate, and a second end pivotally secured together. The second ends of the bars each includes a plurality of teeth formed thereon and engaged with each other for positioning the bars relative to each other at the selected angular position.

The second ends of the bars each includes an orifice formed therein, the teeth are provided around the orifice thereof respectively.

A device may further be provided for fastening the board to the vehicle seat, and includes at least one strap for attaching to the vehicle seat, at least one first fastening member attached to the at least one strap, and at least one second fastening member attached to the board, for engaging with the at least one first fastening member and for securing the board to the vehicle seat.

A bag may further be provided and includes a box for receiving the monitor, a processor device may be received in the bag. The bag may include a strap for attaching to users.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
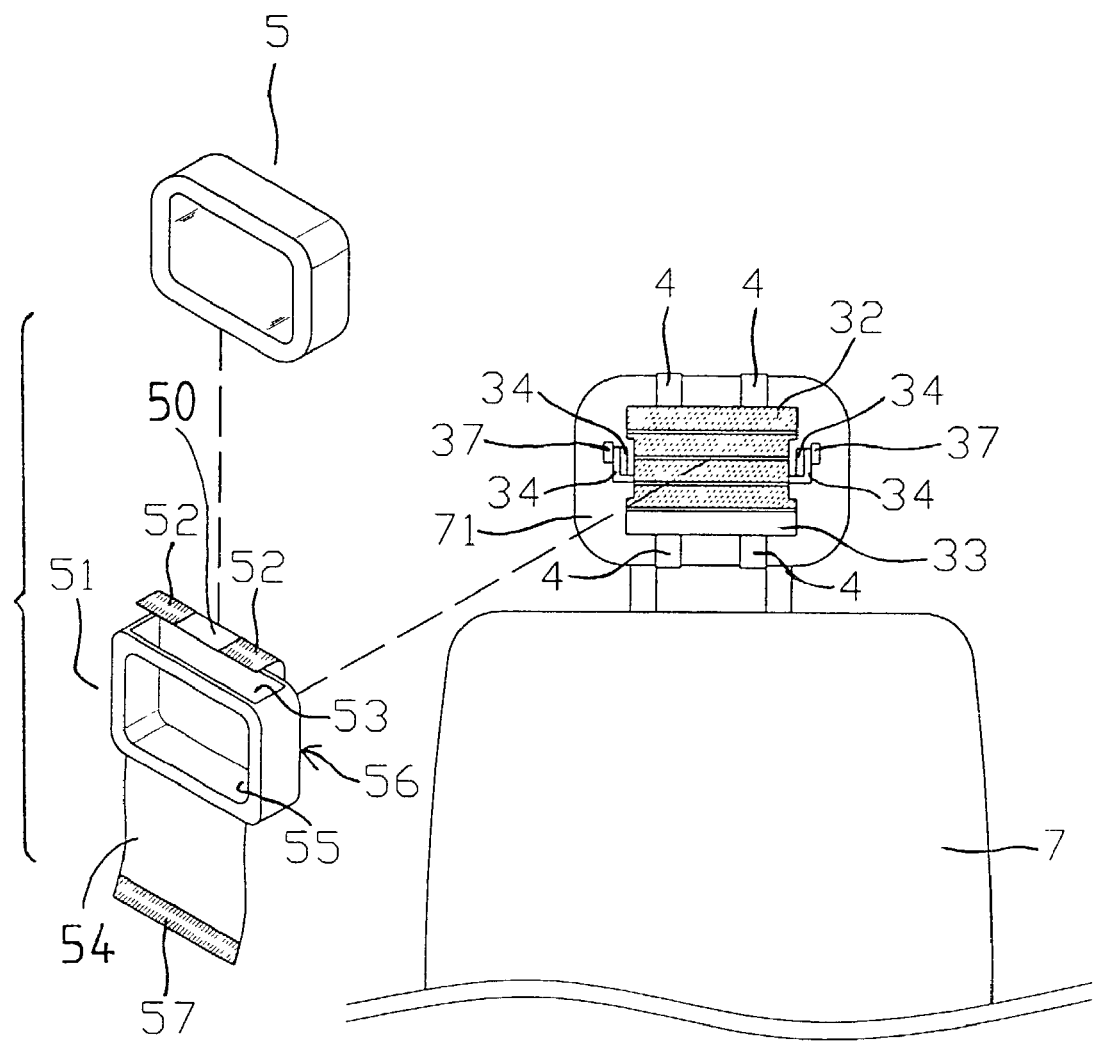
FIG. 1 is a partial exploded view illustrating the attachment of a monitor supporting device in accordance with the present invention to a vehicle.
Figure 2:
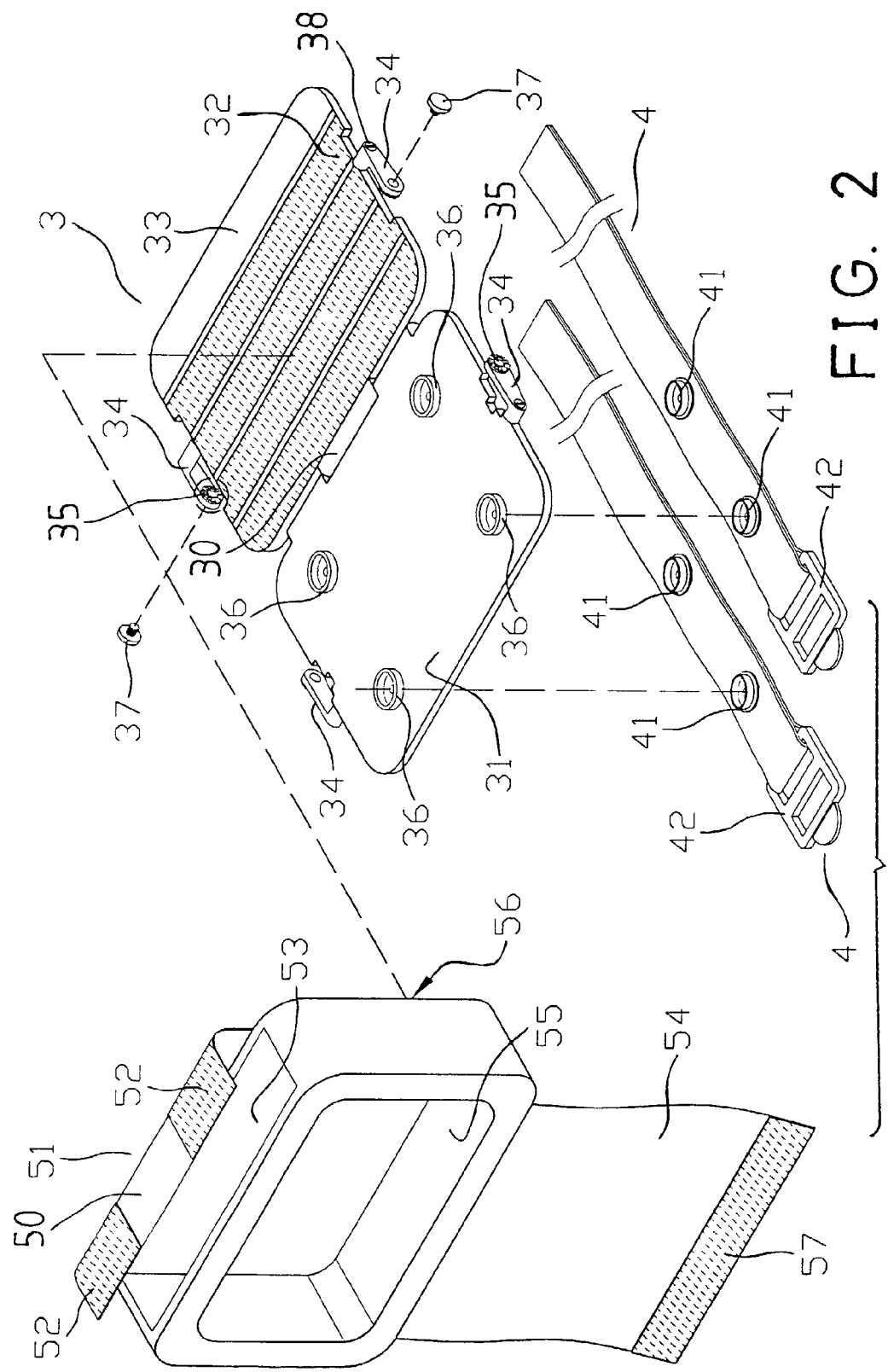
FIG. 2 is another partial exploded view of the monitor supporting device.
Figure 6:
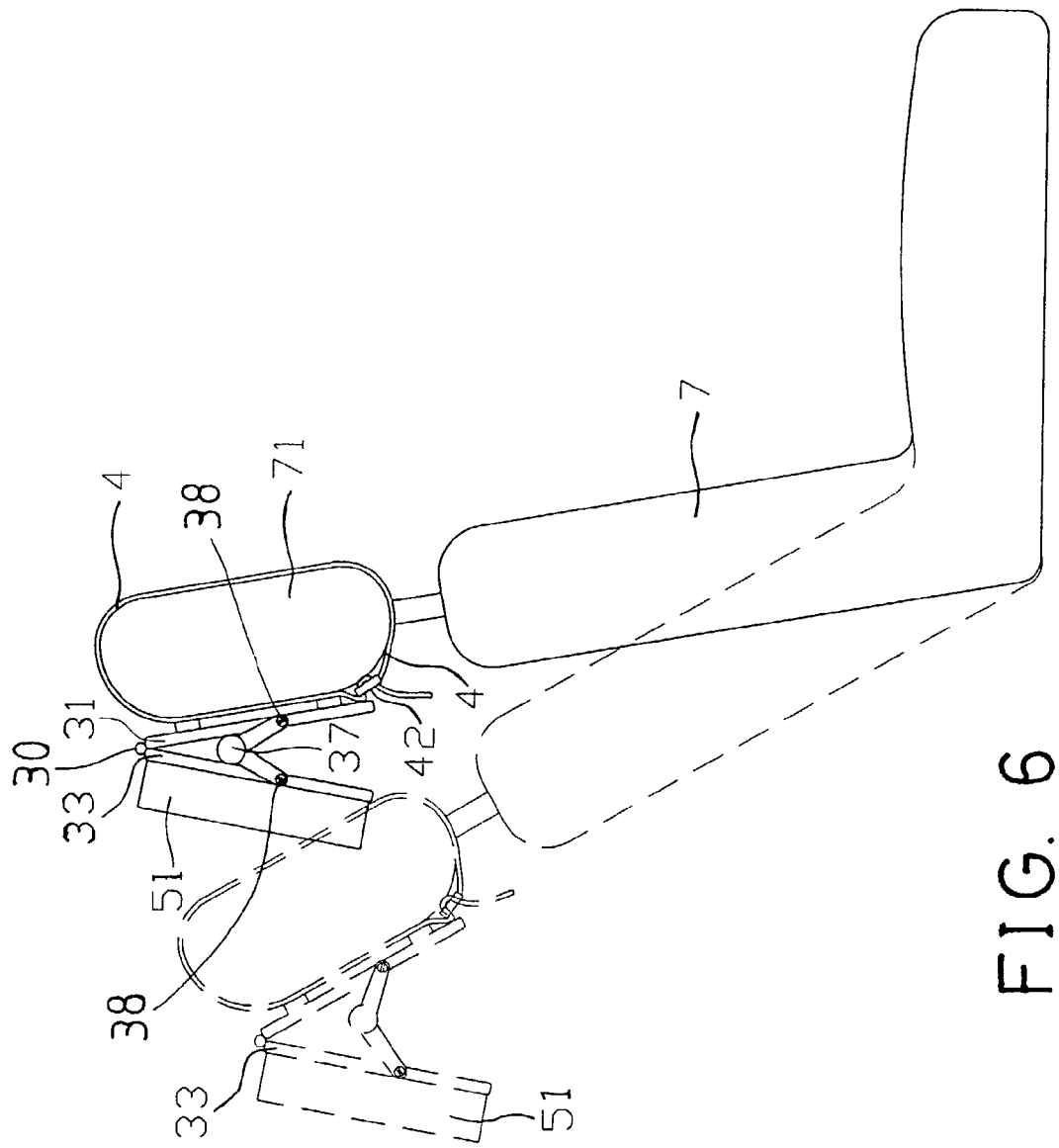
FIG. 6 is a side schematic view illustrating the operation of the monitor supporting device.
Figure 7:
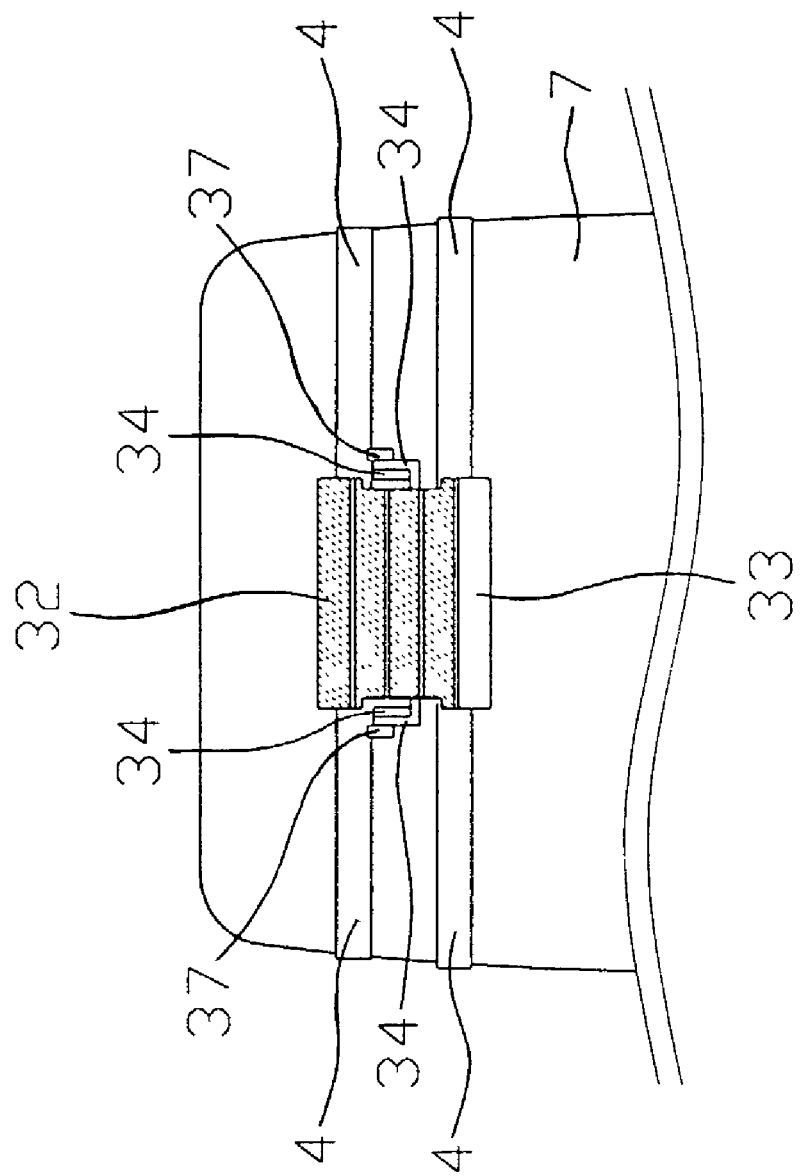
FIG. 7 is a partial rear view illustrating the attachment of the monitor supporting device to the seat of the vehicle.

Referring to the drawings, and initially to FIGS. 1 and 2, a monitor supporting device in accordance with the present invention comprises a seat 3 including a board for attaching to the head rest 71 of vehicle seats 7 (FIGS. 1, 6), or for directly attaching to the vehicle seat 7 (FIG. 7).

For example, one or more straps 4 may be secured onto the head rest 71 and/or to the vehicle seat 7 with fastener buckles 42, and each includes one or more buckle members, clips, buttons, fastener members 41 or the like provided or attached thereon.

The board 31 also includes one or more buckle members, clips, buttons, fastener members 41 or the like provided or attached thereon for engaging with the fastener members 41 of the straps 4 and for attaching the board 31 of the seat 3 to the head rest 71 and/or to the vehicle seat 7 head rest 71 of vehicle seats 7.

The seat 3 further includes a plate 33 having one side or one edge, such as the upper portion, rotatably or pivotally secured to the board 31 with a hinge or a joint or a pivot axle 30, for allowing the plate 33 to be rotated relative to the board 31 to any suitable angular position.

Figure 4:
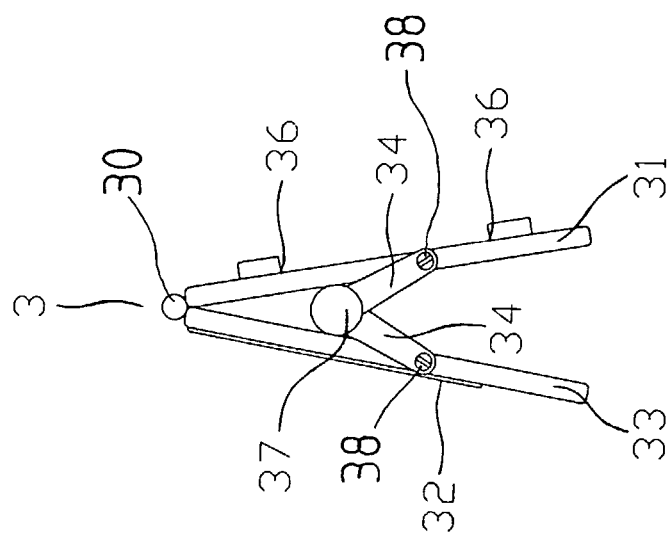
FIGS. 4, 5 are plan schematic views illustrating the adjustment of the monitor supporting device.
Figure 5:
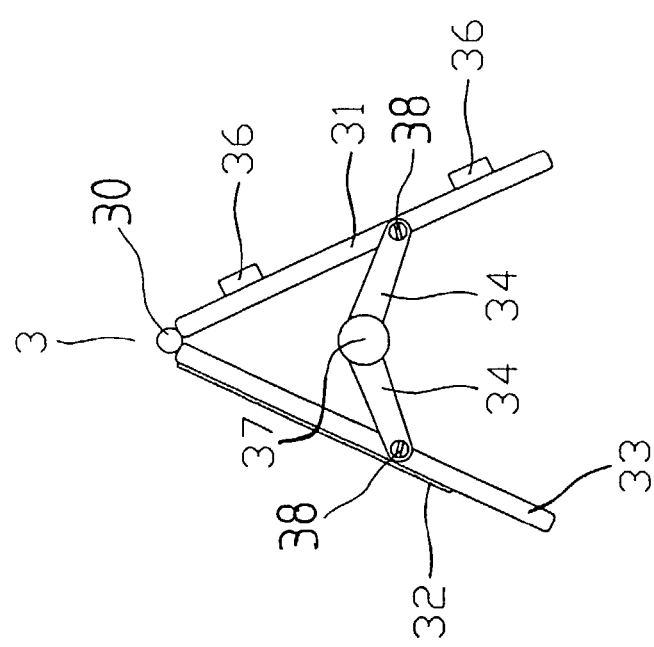

The board 31 and the plate 33 each includes one or more, such as two bars 34 each having one end rotatably or pivotally secured to the sides thereof with pivot pins 38, and the other end rotatably or pivotally secured together with fasteners or pivot rods 37, for securing the board 31 to the plate 33 at various angular positions (FIGS. 4–6), particularly when the seat back of the vehicle seat 7 is adjusted or tilted to different angular positions.

Figure 3:
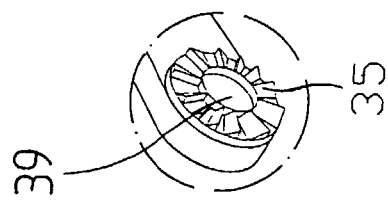
FIG. 3 is a partial perspective view illustrating a joint device of the monitor supporting device.

As best shown in FIG. 3, the bars 34 each preferably includes an orifice 39 formed in the other end thereof for receiving the pivot rods 37 respectively, and each includes a number of teeth, such as the ratchet teeth 35 formed or provided around the orifice 39 thereof or around the pivot rod 37.

The teeth 35 of the bars 34 may be engaged with each other when the other ends of the bars 34 are secured together with the pivot rods 37 respectively, for solidly retaining the bars 34, and thus the board 31 and the plate 33 at any suitable or selected angular position.

The bars 34 may be adjusted relative to each other by unthreading or loosening the pivot rods 37 relative to the bars 34 respectively, or may be adjusted relative to each other directly or forcibly without unthreading or loosening the pivot rods 37 relative to the bars 34, due to the engagement between the ratchet teeth 35 of the bars 34. One or more pairs of the bars 34 may thus be formed as a retaining means for retaining the plate 31 and the board 33 at the required or selected angular positions.

The plate 33 may thus be adjusted relative to the board 31 and/or to the head rest 71 or the vehicle seat 7 to any suitable or selected angular position. The plate 33 includes a fastener element 32, such as a hook-and-loop fastener element 32 attached thereto for attaching or securing or supporting the other objects.

For example, a casing 51 includes a fastener element 56, such as a hook-and-loop fastener element 56 attached to the rear portion thereof for engaging with the fastener element 32 of the plate 33, and for detachably attaching or securing the casing 51 to the seat 3.

The casing 51 includes an opening 53 formed in the upper portion thereof for receiving a monitor 5 (FIGS. 1, 8) therein, and includes a transparent window 55 formed or provided in the front portion thereof, for allowing the monitor 5 to be seen or viewed through the window 55 of the casing 51.

The casing 51 may include a flap 50 provided on the upper portion thereof for selectively enclosing the upper opening 53 thereof, and having one or more fastener elements 52, such as the hook-and-loop fastener elements 52 provided thereon.

The casing 51 further includes a panel 54, preferably a transparent panel 54 provided on the lower portion thereof for selectively enclosing the window 55 thereof, and having one or more fastener elements 57, such as the hook-and-loop fastener elements 57 provided thereon for engaging with the fastener element 52 of the flap 50, and for detachably retaining the monitor 5 in the casing 51.

In operation, as shown in FIG. 6, the plate 33 and thus the casing 51 and/or the monitor 5 may thus be adjusted relative to the board 31 and/or to the head rest 71 or the vehicle seat 7 to any suitable or selected angular position, by rotating the plate 33 relative to the board 31. The casing 51 and the fastener elements 32, 56 may thus be formed as an attaching means for securing or attaching the monitor 5 to the plate 33.

Figure 8:
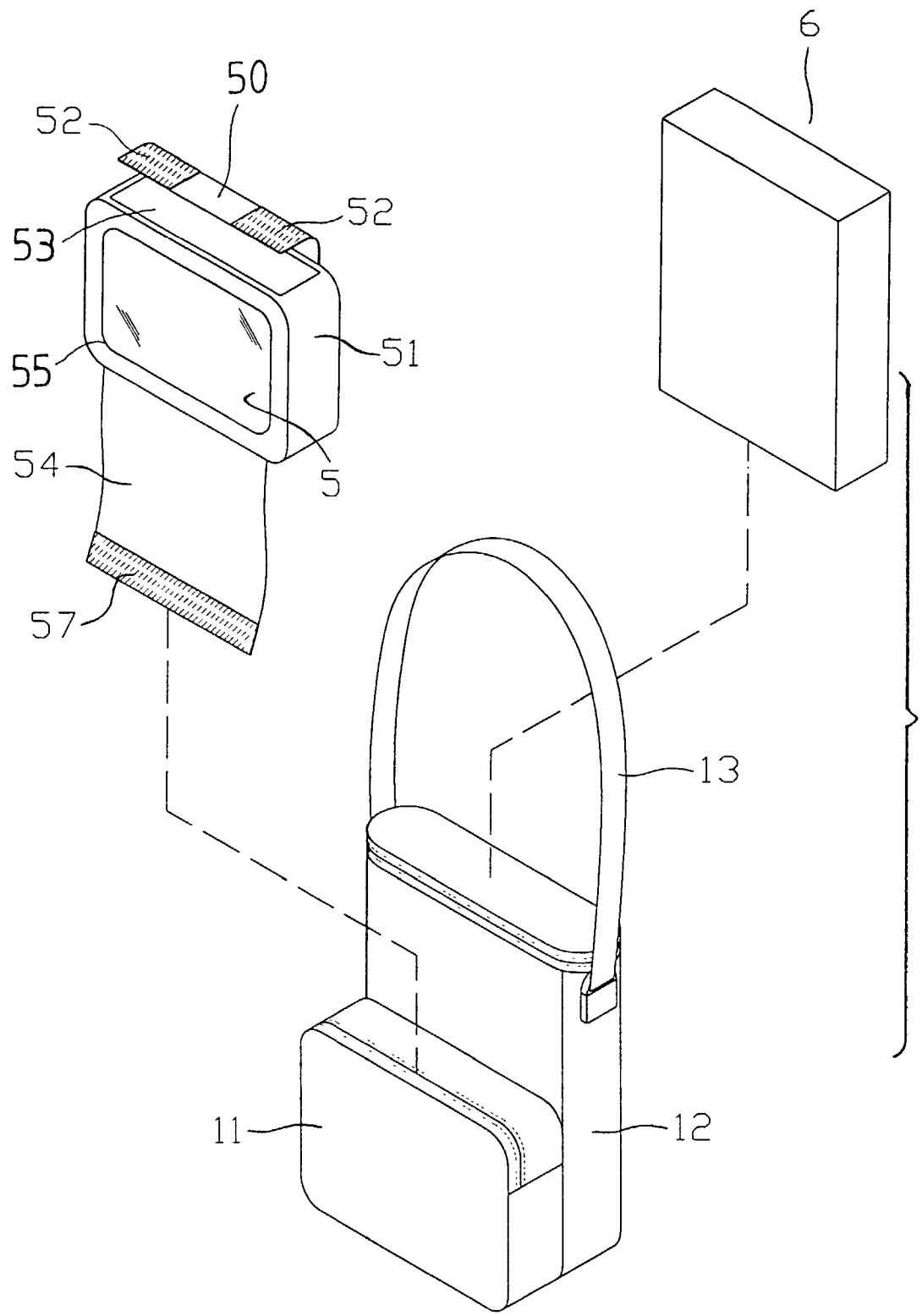
FIG. 8 is a further partial exploded view of the monitor supporting device.

Referring next to FIG. 8, the monitor supporting device further includes a suitcase or a bag 12 for receiving an image signal generating device or a processor device 6 therein, and a strap 13 for attaching to the users, and a box 11 provided on the front portion thereof, for receiving the casing 51, and for allowing the casing 51 and the monitor 5 and the processor device 6 to be easily carried out of the vehicle by the users.

Accordingly, the monitor supporting device in accordance with the present invention may be used for attaching the monitor to the vehicle at any suitable positions, and for allowing the users to view the monitor at the best viewing direction or angle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A monitor supporting device for attaching to vehicle seats, said monitor supporting device comprising:
    a board for attaching to the vehicle seat,
    a plate pivotally secured to said board with a pivot axle, for allowing said plate to be rotated and adjusted relative to said board to selected angular positions,
    a monitor,
    means for attaching said monitor to said plate,
    means for retaining said plate to said board at the selected angular positions relative to the vehicle seat, and
    means for fastening said board to the vehicle seat, said fastening means including at least one strap for attaching to the vehicle seat, at least one first fastening member attached to said at least one strap, and at least one second fastening member attached to said board, for engaging with said at least one first fastening member and for securing said board to the vehicle seat.

2. The monitor supporting device according to claim 1 further comprising a bag including a box provided thereon, a processor device received in said bag, and said box being provided for receiving said monitor.

3. The monitor supporting device according to claim 2, wherein said bag includes a strap for attaching to users.

4. The monitor supporting device according to claim 1, wherein said retaining means includes a first bar having a first end pivotally secured to said board and a second bar having a first end pivotally secured to said plate, and said first and said second bars each includes a second end pivotally secured together.

5. The monitor supporting device according to claim 4, wherein said second ends of said first and said second bars each includes a plurality of teeth formed thereon and engaged with each other for positioning said first and said second bars relative to each other at the selected angular position.

6. The monitor supporting device according to claim 5, wherein said second ends of said first and said second bars each includes an orifice formed therein, said teeth are provided around said orifice thereof respectively.

7. The monitor supporting device according to claim 1, wherein said attaching means includes a casing for receiving said monitor, and means for securing said casing to said plate.

8. The monitor supporting device according to claim 7, wherein said securing means includes a first fastener element disposed on said casing, and a second fastener element disposed on said plate, for engaging with said first fastener element, and for securing said casing to said plate.

9. The monitor supporting device according to claim 7, wherein said casing includes a transparent window formed therein for viewing said monitor.

10. The monitor supporting device according to claim 7, wherein said casing includes an upper opening formed therein for receiving said monitor.

11. The monitor supporting device according to claim 10, wherein said casing includes a flap provided thereon for selectively enclosing said upper opening thereof, and for retaining said monitor in said casing.

12. The monitor supporting device according to claim 11, wherein said casing further includes a panel having a first fastener element disposed thereon, and a second fastener element disposed on said flap, for engaging with said first fastener element, and for securing said flap to said casing.

* * * * *